Figure 1:
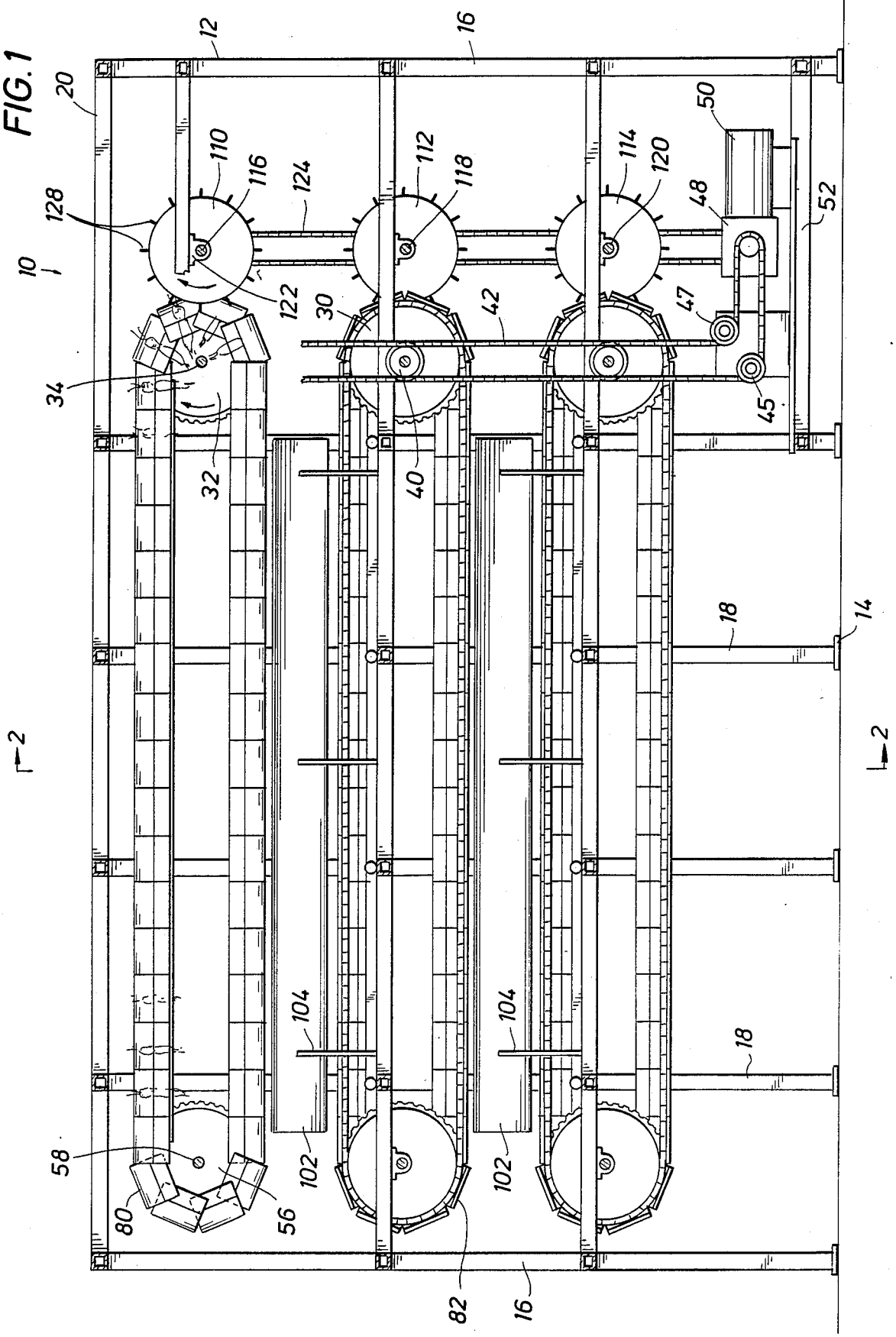

United States Patent [19]

Stipe

[11] Patent Number: 4,934,028
[45] Date of Patent: Jun. 19, 1990

[54] APPARATUS FOR DEHEADING AND GRADING SHRIMP

[75] Inventor: James J. Stipe, Baytown, Tex.
[73] Assignee: Speed Shrimp D-Header Int'l Inc., Baytown, Tex.
[21] Appl. No.: 335,091
[22] Filed: Apr. 7, 1989
[51] Int. Cl.⁵ ............................................. A22C 29/00
[52] U.S. Cl. ............................................ 17/71; 17/63
[58] Field of Search .................... 17/63, 71, 72, 73, 48

[56] References Cited

U.S. PATENT DOCUMENTS

| | | | |
|---|---|---|---|
| 2,622,270 | 12/1952 | Envoldsen | 17/45 |
| 2,663,897 | 12/1953 | Greiner et al. | |
| 2,663,900 | 12/1953 | Greiner et al. | |
| 2,785,435 | 3/1957 | Lapeyre et al. | 17/73 |
| 2,794,209 | 6/1957 | Self | 17/71 |
| 2,888,709 | 6/1959 | Lapeyre | |
| 2,958,896 | 11/1960 | Merrick | |
| 3,281,889 | 11/1966 | Pollitzer et al. | |
| 3,451,100 | 6/1989 | Lee | 17/71 |
| 3,629,904 | 12/1971 | Zober | 17/71 |
| 3,698,038 | 10/1972 | Jones, Jr. | 17/71 |
| 3,703,746 | 11/1972 | Jones, Jr. | 17/71 |
| 3,784,007 | 1/1974 | Skrmetta | 209/85 |
| 4,016,625 | 4/1977 | Mitchell | 17/71 |
| 4,054,970 | 10/1977 | Metzger et al. | 17/71 |

*Primary Examiner*—Willis Little
*Attorney, Agent, or Firm*—James L. Jackson, Assoc.

[57] ABSTRACT

A shrimp deheading and grading mechanism which incorporates a shrimp deheading structure forming a shrimp deheading station. A shrimp conveyor and orienter is operative for conveying shrimps oriented in head-up, body down position to the shrimp deheading station. A shrimp deheading wheel having a plurality of flexible or rigid shrimp deheading fingers projecting therefrom is rotatable at the shrimp deheading station and contacts the shrimp heads to remove them from the bodies by means of a "flicking" action. The conveyor incorporates a plurality of pan segments which collectively form a movable trough having a slot at the bottom portion thereof. Shrimps smaller than a preselected size range will fall through the slot while shrimp of the preselected size range will be gripped and supported by the opposed pan segments of the conveyor. The conveyor pans engage the shrimps in a pivotal-like manner thereby permitting the heavier body portions of the shrimps to pivot downwardly such as that each of the shrimps is positioned in head-up, body down relation upon arrival at the deheading station such that the shrimp heads are contacted by the flexible or rigid fingers and removed. Several shrimp deheading machines may be placed in cascading relation with succeeding machines being adjusted for smaller size ranges of shrimps falling from the conveyor of the immediately preceding shrimp deheading machine. The machine is also applicable for grading heads-on shrimp.

19 Claims, 3 Drawing Sheets

APPARATUS FOR DEHEADING AND GRADING SHRIMP

1. FIELD OF THE INVENTION

This invention relates generally to apparatus for removing the heads of shrimps from the bodies thereof in preparation for shrimps for marketing and for insuring extended storage life thereof More specifically, the present invention relates to apparatus for deheading and grading random sizes of shrimps and for insuring removal of only the head portion of the shrimps while leaving substantially all the edible portion thereof on t he body or tail portion of the shrimps.

2. BACKGROUND OF THE INVENTION

Shrimps are typically gathered for marketing by means of nets which are operated by shrimp boats or by other suitable means. After the shrimps are caught they are typically stored in ice or in other conditions of cold storage until they can be transported to a shrimp processing facility. At the shrimp processing facility the shrimps may be packed in a heads on condition or in a headless condition for transportation to a marketing facility or to the ultimate consumer. It has been determined that the storage life of shrimps is approximately doubled if the heads are removed from the bodies of the shrimps immediately after the shrimps have been removed from the water. This is ordinarily not practical since most shrimp deheading machines are of such large dimension that they cannot be efficiently mounted on a typical shrimp boat. Although in many cases fresh caught shrimp are deheaded on manual operations on board shrimps boats for the purpose of enhancing the storage life thereof manual deheading operations can only be conducted if the volume of shrimp being caught is fairly low. In fact it has been determined that only approximately 10% of the shrimps being caught are manually deheaded. Further, manual deheading operations during shrimp catching and processing activities significantly enhances of the cost of the shrimps and accordingly is considered impractical. It is considered desirable to place on board shrimp boats and other such vessels a shrimp deheading machine of sufficient sufficiently small dimension and of sufficiently low cost as to be commercially available for most shrimp boats.

In a review of some of the prior patents involving shrimp processing machines the heads of the shrimps are removed from the bodies thereof by rolls or other devices that accomplish squeezing or pinching of the shrimps. Obviously pinching or squeezing of the shrimps during processing thereof can sufficiently bruise the flesh of the shrimps that the storage life thereof can be adversely affected. It is desirable therefore to provide a shrimp processing system having the capability of effecting removal of the heads of the shrimps of the bodies thereof by means other than squeezing or pinching to thus insure that the body portions of the shrimps are maintained at optimum quality during the deheading process.

Is therefore a principle feature of the present invention to provide a novel deheading machine for shrimps which is capable of receiving shrimps in random manner, properly orienting the shrimps and conveying them to a deheading station where the heads thereof are mechanically separated from the bodies by means of flexible deheading members. The shrimps may be loaded onto the conveyor by a manual loading operation or by means of loading conveyers or the like.

It is also a feature of this invention to provide a novel shrimp deheading machine that has the capability of accomplishing the grading of the shrimps simultaneously with deheading therefore.

It is an even further feature of this invention to provide a novel shrimp deheading and grading machine which may be designed to permit multiple cascaded orientation of shrimp deheading machines to insure grading a deheading of shrimps of random sizes.

It is an even further feature of this invention to provide a novel shrimp deheading and grading machine that is of sufficiently small dimension and of sufficiently low cost as to effectively facilitate utilization thereof on board most shrimp boats to thereby enable shrimp deheading and grading operations to be conducted immediately after the shrimp are caught.

3. SUMMARY OF THE INVENTION

Briefly a shrimp deheading and grading machine constructed in accordance with the principles of the present invention comprises a framework structure supporting a pair of spaced endless conveyers such as chain conveyers which are operated at the same speed and which cooperate to form a shrimp receiving receptacle and conveyers. Each of the endless conveyers are provided with a plurality of conveyor pans which travel in endless manner along with the respective conveyers and which defined cooperating shrimp retainer portions capable of supporting shrimps of a particular size or larger. The shrimp retaining portions of the conveyor pans are also capable of achieving proper orientation of the shrimps as they are conveyed by the conveyers system toward a deheading station and to transport the shrimps in a proper oriented manner through the deheading station. Shrimps of smaller size than the particular minimum size for which the shrimp conveyers system is adjusted will fall through the slot or space established by the conveyers where they may be transported by simple slides or other devices to the conveyers of other shrimp deheading machines which are properly adjusted for smaller sized shrimps. In fact, several deheading and grading machines maybe positioned in cascading relation such that the uppermost machine accomplishes deheading of larger shrimps, one or more intermediate machines provide deheading operations for medium sized shrimps and a lower most machine will receive and dehead smaller sized shrimps. The shrimps of random size will be deposited onto the conveyers system of the uppermost grading and deheading machine and, during operations, medium and small sized shrimps will fall through the openings of the conveyers system while the larger sized shrimps will be retained and positioned by the conveyers system and thus conveyed to a deheading station where the heads are removed. The medium and small sized shrimps will fall onto a slide beneath the uppermost machine whereupon they are deposited onto the conveyers of a lower most machine. Again, the larger ones of these shrimp will be retained and positioned for deheading by the conveyers of the next succeeding machine while the yet smaller sized shrimps will fall onto a slide for conducting them to the conveyers of a yet succeeding machine. For purposes of this invention the machines are described as being disposed in cascading relation. The resulting shrimps that are deheaded by each of the machines will be graded to a significant degree simultaneously with the deheading operation. Consequently, further processing of the shrimps for marketing can be accomplished by other grading machines and procedures at significantly low cost. In the alternative, in the event the shrimps are to remain in a head-on condition the deheading wheel may be restricted to an inoperation position. The shrimps will thus be discharged from the machine in a graded but heads-on condition.

The deheading operation is conducted by one or more deheading wheels which are position such that resilient fingers projecting therefrom will contact the heads of the shrimp and thus accomplish removal of the head. When the heads of the shrimps have been removed the body or tail portions thereof will simply fall downwardly into a chute or conveyers of other character whereupon they are conveyed to an appropriate site for further processing. The heads of the shrimps will be directed by the resilient fingers of the deheading wheels to another chute or conveyers which will transport the heads to a suitable facility for disposal. If desired, the fingers of the deheading wheel may be of rigid character, but for purposes of simplicity they are discussed herein as flexible.

The flexible fingers or projections that extend from the deheading wheels may extend radially from the out of peripheries of the wheels as shown above or, in the alternative, may extend in other suitable direction appropriate for bringing the tips of the flexible projections into contact with the head portions of the shrimps. Upon contact with the heads of the shrimps the resilient fingers, which may be composed of rubber or any other suitable resilient material will flex slightly such that the heads of the shrimp are removed by a "flicking" action that occurs as the neck or throat of the connection between the head and body portions of the shrimps is yielded by the force imparted by the resilient fingers. This flicking action will not occur if the fingers or projections are rigid.

The shrimp deheading and grading machine of this invention is adjustable to accommodate various sized shrimps. This adjustability may be accomplished through adjustment of conveyers guide and positioning bars or by adjustment of the spaced sprockets of the conveyers or by a combination of both types of adjustment as well as any other means of adjustment.

4. BRIEF DESCRIPTION OF THE DRAWINGS

The invention maybe better understood, and further advantages and uses thereof more readily apparent, when considered in view of the following detailed description of a preferred embodiment of the invention, in which:

FIG. 1. Is a side view of a shrimp grading and deheading machine which is constructed in accordance with the teachings of the present invention and which represents the preferred embodiment of the invention.

Figure 2:
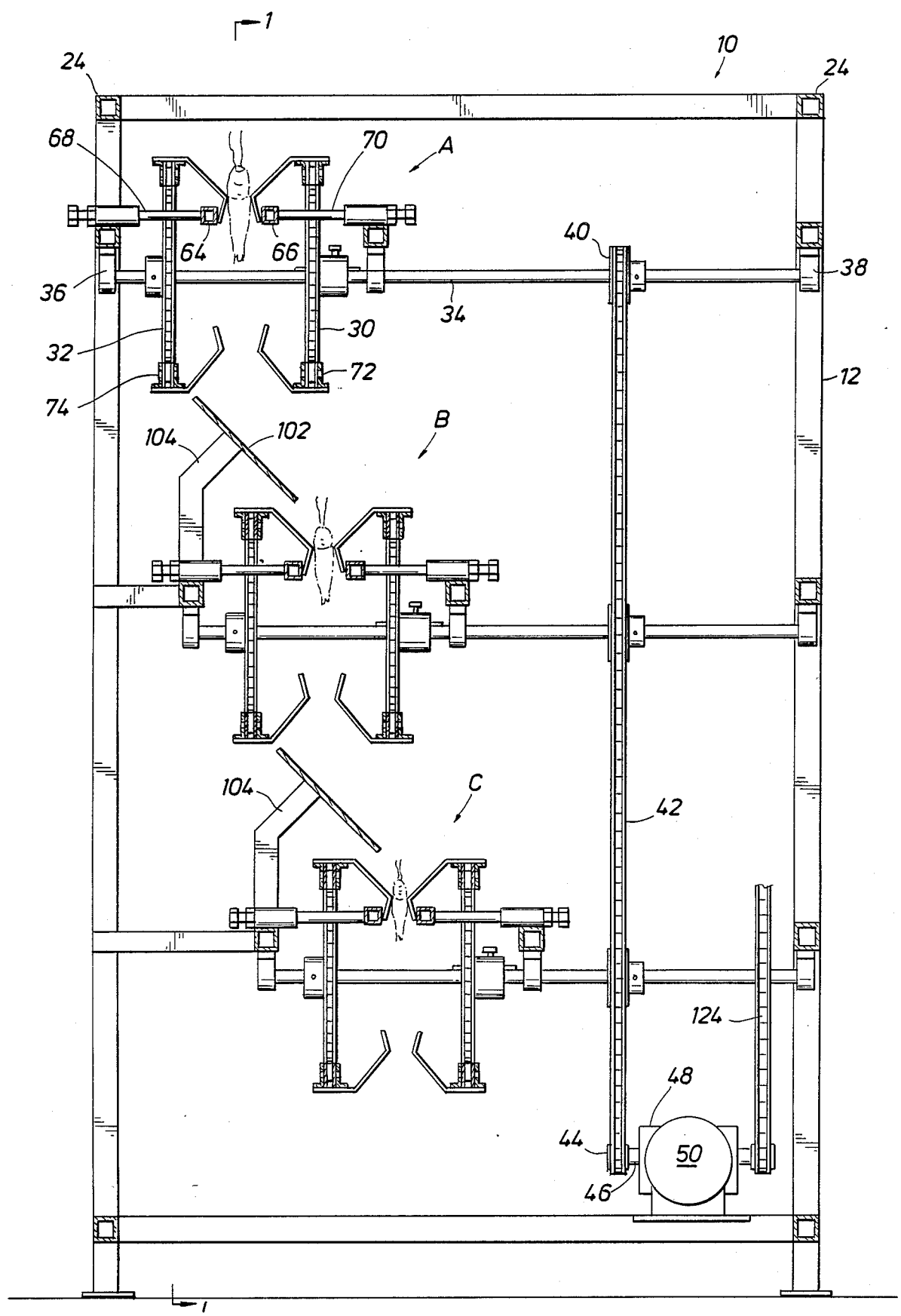

FIG. 2. Is a plan view of the shrimp deheading machine of FIG. 1.

Figure 3:
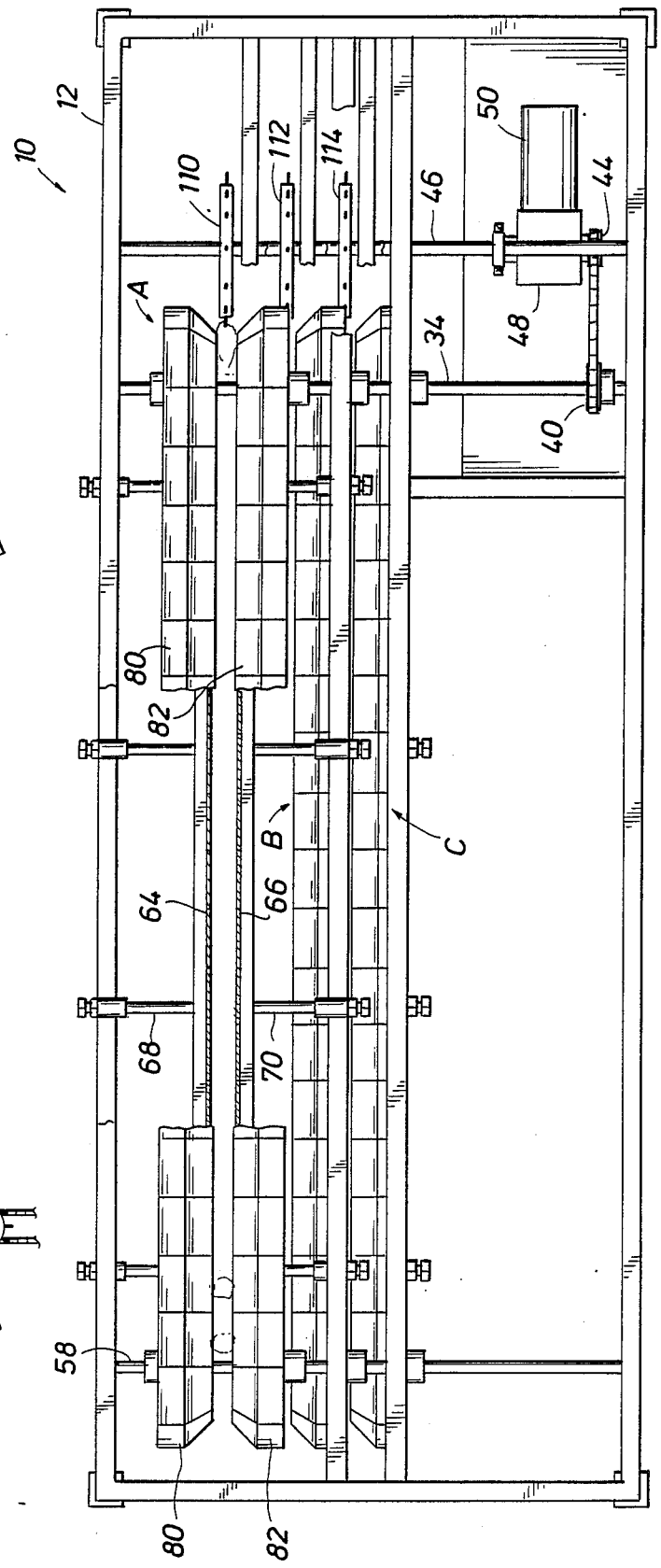

FIG. 3. Is an end view of the shrimp deheading machine of FIGS. 1 & 2.

Figures 4, 5:

FIG. 4. Is a fragmentary view showing shrimp deheading apparatus having two deheading wheels which may be disposed in counterrotating relation.

FIG. 5. Is a fragmentary view showing an alternative thereof wherein the shrimp deheading wheel is retractable such as would be used for grading and for delivery of graded heads-on shrimps.

Figure 6:
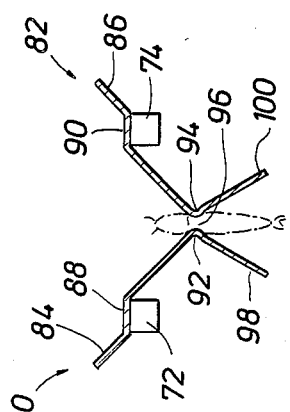

FIG. 6. Is a fragmentary sectional view of the conveyor showing the preferred confirmation of the pan segments thereof and, in broken lines, showing a shrimp being supported thereby.

5. DETAILED DESCRIPTION OF PREFERRED EMBODIMENT

Referring now to the drawings and first to FIG. 1. A shrimp deheading and grading machine constructed in accordance with the present invention is illustrated generally at 10 and comprises a framework structure 12 having a base structure 14 enabling the machine to rest upon any suitable substantially flat surface or upon any suitable structure appropriately supporting the framework. The shrimp deheading machine 10 may generally be described as a triple cascading shrimp deheading and grading machine assembly which is capable of deheading 3 grades of shrimps which may be received in random manner by an uppermost conveyor of the machine. The triple cascading machine structure shown in the drawings is of sufficiently small dimension that it may be efficiently mounted on the deck or other work station of a shrimp boat for grading and deheading shrimps immediately upon removal thereof from the water or, in the alternative, the machine may be appropriately mounted at the fixed based facility such as at a processing facility at a "shrimp farm" or shore based shrimp processing plant for accomplishing shrimp deheading and grading operations.

As shown the framework 12 incorporates vertical corner members 16 and intermediate vertical members 18 to provide for structural support of the framework as well as to provide for structural support of the operational components of the shrimp conveyers and shrimp deheading apparatus. The framework structure 12 also incorporates upper and lower horizontal members 20 and 22 as well as a plurality of intermediate horizontal structural members which are shown at .24, 26, and 28. These horizontal members maybe appropriately described as "groups" of horizontal structural members that cooperate with groups of vertical structural members to define a framework of efficient structural integrity without being excessively heavy or bulky. The vertical and horizontal structural members of the framework 12 are preferably composed of stainless steel of angle or tubular form which may be structurally interconnected by any suitable means such as welding, bolting, riveting etc.

The shrimp deheading machine shown in the figures incorporates three conveying and deheading sections each is which may be substantially identical. These shrimp conveyor and deheading sections are identified as Sections A, B and C which are shown generally in the drawings. For purposes of discussion and simplification and to facilitate a ready understanding of this invention one of the conveyor deheader sections will be described in detail while the other conveyor deheading sections will be described in less detailed manner.

The conveyor deheader Section A incorporates an endless chain conveyor although such is not intended as limiting the spirit and scope of this invention. Other suitable conveyor mechanisms maybe effectively utilized without departing from the spirit and scope of this invention. As shown in the drawings a pair of conveyor sprockets 30 and 32 are supported in nonrotatable relation by a transverse drive shaft 34 which is in turn supported at its respective extremities by pillow block bearings 36 and 38 that are each fixed to the respective intermediate horizontal structural members 24. Thus, the sprockets 30 and 32 are maintained in space relation and are simultaneously rotated concurrently with rotation of the conveyor drive shaft 34. A drive shaft sprocket 40 is also disposed in nonrotatable relation with the drive shaft S4 and is adapted to receive a drive chain 42 in sprocket driving relation therewith. The drive chain 42 is in turn driven by a drive sprocket 44 which is fixed to the output drive shaft 46 of a reduction gear assembly disposed in sealed and lubricated assembly within a reduction gear box 48. The reduction gear assembly which, for example may be a 60-1 reduction gear system, is in turn driven by an electric motor 50 such as a ½ horsepower electric motor that is supported by a motor and gear box support 52 of the framework structure 12.

The spacing of the spaced sprockets 30 and 32 maybe fixed if desired or in the alternative, the sprockets 30 and 32 maybe adjustable to vary the spacing of the sprockets and thus controllably vary the spacing of the conveyor chains and the conveyor pans supported thereby.

At the opposite end of the framework structure 12 a pair of driven sprockets 54 and 56 are supported in nonrotatable relation by means of a driven shaft 58. The shaft 58 is freely rotatable and journaled by means of pillow block bearings 60 and 62 which are in turn supported by the intermediate horizontal members 24 of the framework assembly. The spacing of the sprockets 54 and 56 may be fixed if desired but, in the alternative, maybe adjustable in the same manner as sprockets 30 and 32 may be adjustable for controllably varying the spacing of the shrimp supporting and conveying pans of the conveyor to thus establish shrimp grading for the particular variations of the size of the shrimps being processed by the shrimp deheading and grading machine. Adjustments of the shrimp conveyor and supporting pans may also be accomplished by means of a pair of spaced conveyor guide and adjustment bars 64 and 66 each having angled extremities defining diverging guide bar relationships at the respective ends thereof. A plurality of adjustment bars 68 and 70 are adjustabley supported by the framework 12 and are connected in adjusting relation to respective portions of the guide and adjustment bars 64 and 66. Typically the adjustment bars 68 and 70 have externally threaded section defined thereon which are received in driving relation with internally threaded elements fixed to the framework assembly. Therefore upon rotation, of the adjustment bars, the guide and adjustment members 64 and 66, which may also be referred to as spreader bars, are moved toward or away from one another for purposes of adjusting the relative spacing of the conveyers.

A pair of endless chains 72 and 74 are disposed about the respective pairs of horizontally spaced sprockets 30-54 and 32-56. Since the sprockets are driven at the same rotational low velocity by virtue of their being nonrotatably related to the drive shaft 34, the conveyor chains 72 and 74 will likewise be driven at the same speed.

As shown in Section in FIG. 2 a plurality of conveyor pan segments or trays are fixed to the various links of the conveyor chains 72 and 74. These pan segments are shown generally at 80 and 82 and are formed of sheet metal such as stainless steel. The conveyor pan segments of each of the conveyor chains are oriented in opposed mirror image spaced relationship and are moved about an endless path by the respective conveyor chains. The pan segments define upwardly diverging sections 84 and 86 which cooperate to form an open ended trough in which random sized shrimp are received. Each of the pan segments also includes an intermediate connecter section such as shown at 88 and 90 and which are respectively connected to links of the conveyor chains 72 and 74 The connection between the pan segments and the conveyor chains may take any suitable form without departing from the spirit and scope of this invention. For example, the conveyor pan segments may be welded to the links of the conveyor chains or may be attached by means of bolts, rivets or the like. As shown in detail in FIG. 6, intermediate portions of the pan segments are reverse bent at 92 and 94 so as to define a space 96 therebetween. The reverse bent sections 92 and 94 of the conveyor pans are smoothly rounded and form a frictional gripping surface for engagement with opposite sides of individual shrimps to provide support for the shrimps. Below the reverse bent sections 92 and 94 of the conveyor pans the conveyor pans define downwardly diverging sections 98 and 100.

Upon placement of a quantity of random sized shrimps in the trough defined by the upward diverging sections of the conveyor pans the shrimps will descend to the bottom of the troughs and the bodies or tails of the shrimps, being heaver than the head portions of the shrimps, will fall through the elongated opening 96 which is collectively defined by the conveyor pan segments. Shrimps of the size for which the grading aspects of the conveyor system is set will lodge and be restrained in the head- up tail -down position shown in broken line in FIG. 6 shrimps of smaller dimension will fall through the space or slot 96 onto a slide 102 extending from a support 104 projecting from a vertical or structure element of the framework 12. As shown in FIG. 3 the structural support 104 of the slide 102 extends substantially horizontally and then projects upwardly from an vertical structural member of the framework. The slide 102 is preferably an elongated sheet member which may be flat as shown or which may be of any other suitable form. The slide will typically be supported by a plurality of horizontally supports such as that shown at 104. The shrimps falling from the uppermost conveyor, because they are of insufficient size, will contact the angled slide member 102 and will be conducted to the next succeeding conveyor and deheader assembly. As shown in FIG. 2, three shrimp grading and deheading assemblies are shown with the spacing between the conveyor pans of the intermediate and lower conveyor deheader mechanisms being adjusted to a smaller dimension by the appropriate adjusting bars and by adjustment of the spacing of the respective sprockets thereof.

The shrimp grading and deheading machine of this invention will also be provided with a deheading section incorporating a deheading mechanism for each of the shrimp conveyers. As shown in FIG. 1 three shrimp deheading wheels 110, 112, 114 are carried by respective horizontally disposed shafts 116, 118, 120. The shafts are journaled by means of pillow bock bearings such as that shown at 122 which are in turn supported by respective horizontal members of the framework 12. Each of the deheader wheel shafts includes a sprocket nonrotatably mounted thereon and being disposed in driven relationship by means of an endless drive chain 124. The drive chain is driven by a sprocket 126 which is nonrotatably connected to the output drive shaft of the reduction gear box 48. Thus, the electric motor 50 imparts driving rotation to the conveyor system and also imparts driving rotation to the deheader wheel.

Each of the deheader wheels is provided with a plurality of flexible projections or fingers 128 which may extend radially from the outer or periphery of the respective deheader wheel or which may be of any other configuration suitable for removal of the heads of shrimp. Also, we metioned above, the finger may be rigid character if desired. The sizes of the sprockets attached to each of the deheader wheel shafts 116, 118, and 120 will determine the rotational speed of the deheader wheels. As shown at the upper portion of FIG. 1 the shrimps will be oriented in tail-down, head-up position by pivot-like engagtement thereof by the shrimp engating ridges of the pan segments of the conveyor systems in the manner discussed above and will then be conveyed laterally to the respective deheading stations. As the pairs of conveyor pans move about the respective sprockets at the deheader stations, the shrimps, being retained by the pans will travel in an arcuate manner where the head of shrimps will move through the path of the flexible fingers 128 of the deheader wheels. When this occurs the flexible fingers will strike the heads of the shrimps causing the heads to be forcibly separated from the body portions thereof. Each of the flexible fingers will flex to a certain degree upon initial contact with the head portions of the shrimps then, as the neck or throat portion which joins the heads to the bodies is yielded the flexible fingers will move in a "flicking" action which will project the severed heads away from tho bodies of the shrimp. When the shrimp heads have been separated from the bodies in this manner the bodies will fall onto a lower conveyor (not shown) which will transport them to an appropriate facility for further handling. The heads of the shrimps will be projected by the flexible fingers of the deheading wheels in a different direction in which they will be received by another appropriate conveyor (not shown) for removal to a disposal facility.

As the conveyor pans move about the deheading wheel the pans will move into partially overlapping relation in the manner shown at the right and left pan portions of FIG. 1.

In view of the foregoing it is seen that random sized shrimps may be placed on the uppermost conveyor which will transport the shrimps toward the deheading station for removal by the flexible projecting fingers of the shrimp deheading wheel. Small shrimps will fall through the slot or space defined by the opposed conveyor pans where they will be conveyed by an appropriate slide onto a conveyor of a next succeeding machine located to one side and therebelow. These shrimps will in turn be conveyed by the conveyor of this machine toward the respective deheading wheel. Yet smaller shrimp will fall through the elongated slot or space defined by the intermediate conveyor and will be transported by another slide onto the conveyor of the last shrimp conveyor and deheading machine. As shown in FIG. 1 the shrimp grading and deheading machine assembly will establish three different grades of shrimp, which grades, upon being deheaded may be transported by separate conveyers to appropriate facilities for further processing. Although the shrimp grading and deheading machine system shown in the drawings incorporates three grading and deheading assemblies such as not intended to be limiting with regard to the present invention. A machine may incorporate as many independently adjusted shrimp conveyor and deheading assemblies as is appropriate for the random sizes of shrimps being handled thereby.

Where shrimp are to be graded and delivered in a heads-on condition the deheading wheel or wheels may be retracted to an inoperative position as shown in FIG. 5.

It is therefore seen that the present invention is one well adapted to attain all of the objects and features hereinabove set forth, together with other features which are inherent in the apparatus itself.

Various modes of carrying out the invention are contemplated as being within the scope of the following claims, particularly pointing out and districtly claiming the subject matter which is regarded as the invention

What is claimed is:

1. A method for deheading shrimps, comprising:
    (a) receiving shrimps on a conveyor incorporating opposed pans forming a slot therebetween;
    (b) orienting said shrimps for deheading thereof;
    (c) supporting said shrimps by opposed frictional engagement thereof by said pans such that said shrimps are pivotally supported by said pans, said shrimps being oriented for deheading by pivoting under the influence of gravity to head-up, body-down positions;
    (d) conveying said shrimps to a deheading station;
    (e) moving a plurality of shrimp deheading members through a predetermined path at said deheading station; and
    (f) moving said shrimps in serial fashion into said deheading station and causing the heads of the shrimps to move into said predetermined path where said heads are contacted by said shrimp deheading members and removed from said bodies thereof.

2. The method of claim 1, wherein said conveyor incorporates a pair of endless conveyor elements revolving about spaced circular drives and having a plurality of opposed pairs of inclined pan segments thereof forming said opposed pans and forming said slot at the bottom of said opposed pairs of pan segments; said conveying and said orienting occurring simultaneously.

3. The method of claim 2, wherein said opposed pairs of inclined pan segments form opposed shrimp engaging means, said orienting further comprising:
    establishing pivotal support of said shrimps by said opposed shrimp engaging means for orienting movement of said shrimps by action of gravity whereupon the heavier body portions of said shrimps pivot downwardly from said shrimp engaging means and at least a part thereof projects through said slot, thereby causing said shrimps to be oriented in head-up body-down positions while being moved by said conveyor to said deheading station.

4. The method of claim 3, wherein:
    said conveying induces linear movement to said shrimps along a path defined by said conveyor followed by downward arcuate movement of said shrimps at said shrimp deheading station.

5. The method of claim 1, wherein said conveyor is an endless conveyor defining an elongated conveyor path having substantially straight upper and lower path sections and arcuate end path sections and said plurality of shrimp deheading members being flexible and projecting from shrimp deheading wheel means, said conveying comprising:

(a) moving said shrimps by said conveyor along one of said arcuate end path sections at said deheading station; and (b) rotating said deheading wheel means thus imparting movement to said flexible shrimp deheading members along a circular path that is substantially tangential to said one of said arcuate end path sections and contacting the heads of said shrimps with said flexible shrimp deheading members for separation of the heads of said shrimps from said body portions of said shrimps.

6. The method of claim 1, including: contacting said heads of said shrimps by said flexible shrimp deheading members thus flexing and unflexing said flexible shrimp deheading members in a "flicking" action that projects the separated heads of said shrimps in a predetermined direction from said deheading station for disposal thereof.

7. The method of claim 1, including:
grading said shrimps as to size during said conveying thereof to said shrimp deheading station.

8. The method of claim 7 wherein said grading is accomplished by retaining shrimps of a predetermined size and larger by gripping thereof by said conveyor, whereby shrimps smaller than said predetermined size fall through said slot and from said conveyor.

9. The method of claim 8, including:
(a) placing a plurality of shrimp grading and deheading machines, each having said conveyor and said shrimp deheading members therein in cascading serial relation;

transferring undersized shrimps falling through the slots of respective conveyors to the conveyor of the next succeeding shrimp grading and deheading machine, said shrimps falling from one of said conveyors by said grading being received by the conveyor of the next succeeding shrimp grading and deheading machine and being further graded thereby; and (c) removing the heads of the graded shrimps from the bodies thereof upon contacting the heads thereof by said flexible deheading members at said shrimp deheading stations of each of said shrimp grading and deheading machines.

10. A shrimp deheading mechanism, comprising:
(a) a shrimp deheading structure forming a shrimp deheading station;
(b) shrimp conveying and orienting means being in assembly with said shrimp deheading structure and being operative for conveying shrimps oriented in predetermined manner to said shrimp deheading station;
(c) movable shrimp deheading means being positions adjacent said shrimp deheading station; and
(d) a plurality of flexible shrimp deheading elements projecting from said movable shrimp deheading means and passing through said shrimp deheading station upon movement of said shrimp deheading means for head removing contact with the heads of shrimps as said shrimps are conveyed into said shrimp deheading station by said shrimp conveying and orienting means.

11. The shrimp deheading mechanism of claim 10, wherein said shrimp conveying and orienting means comprises
(a) a plurality of spaced pairs of shrimps conveying pans cooperatively forming a trough for receiving shrimps, said trough having a slot through which undersized shrimps will fall, said shrimp conveying pans each defining shrimp engaging means for establishing supporting engagement with shrimps of a predetermined size range; and (b) means imparting movement to said spaced pairs of shrimp conveying pans for transporting shrimps retained thereby to said shrimp deheading station.

12. The shrimp deheading mechanism of claim 11, including:
adjustment means for controllably establishing desired spacing of said shrimp engaging means to thus establish said predetermined size range of said shrimps to be deheaded by said shrimp deheading mechanism.

13. The shrimp deheading mechanism of claim 11, wherein said means imparting movement to said spaced pairs of shrimp conveying means comprises:
a pair of endless conveying elements disposed in spaced relation and being driven at the same speed, said opposed pairs of shrimp conveying pans being supported respectively by said endless conveying elements.

14. The shrimp deheading mechanism of claim 13, wherein:
(a) spaced conveyor shafts are rotatably supported by said shrimp deheading structure;
(b) spaced pairs of chain sprockets are nonrotably supported by each of said conveyor shafts; and
(c) said endless conveying elements are conveyor chains supporting and orienting said shrimp conveying pans.

15. The shrimp deheading mechanism of claim 11, including:
means of adjusting the spacing of said shrimp conveying pans to the accomplish grading of said shrimps by adjusting said shrimp deheading mechanism for the desired size range of shrimps to be deheaded thereby.

16. The shrimp deheading mechanism of claim 15, wherein said adjusting means comprises:
a pair of guide bars being disposed for guiding and positioning engagement with said shrimp conveying pans guide bar adjusting means being supported by said shrimp deheading structure and being connected to reajoining ones of said guide bars, said guide bar adjusting means being controllably movable relative to said shrimp deheading structure and the selectively adjsuting the positions of said guide bars and said shrimp conveying pans for selectively varying the spacing of said pairs of shrimp conveying pans.

17. The shrimp deheading mechanism of claim 15, wherein said adjsuting means comprise:
means for adjusting the spacing of said chain sprockets on said conveyor shafts.

18. The shrimp deheading mechanism of claim 10, wherein:
(a) a shrimp deheading wheel is rotatably supported by said shrimp deheading structure and is rotatably driven; and
(b) said flexible shrimp deheading elements projecting from said shrimp deheading wheel.

19. The shrimp deheading mechanism of claim 10, wherein:
(a) a plurality of said shrimp conveying and orienting means and a plurality of said movable shrimp deheading elements are arranged in cascading relations and are capable of adjustment to respective preselected size ranges of said shrimps:

(b) said shrimp conveying and orienting means each defining a conveyor slot through which shrimps smaller than said preselected size range fall; and (c) means conducing shrimps falling through said conveyor slot to the next succeeding shrimp conveying and orienting means.

* * * * *